United States Patent Office 3,639,387
Patented Feb. 1, 1972

---

3,639,387
DISPERSE MONOAZO DYES OF THE 5-AMINOPYRAZOLE SERIES
Hans Juergen Sturm, Gruenstadt, Kurt Mayer, Ludwigshafen, Gerhard Kilpper, Mannheim, and Herbert Armbrust, Gruenstadt, Germany, assignors to Badische Anilin- & Soda-Fabrik Aktiengesellschaft, Ludwigshafen (Rhine), Germany
No Drawing. Filed Dec. 3, 1969, Ser. No. 881,899
Claims priority, application Germany, Dec. 20, 1968,
P 18 16 043.5
Int. Cl. C09b 29/38; D06p 1/02
U.S. Cl. 260—163                                            3 Claims

---

ABSTRACT OF THE DISCLOSURE

Disperse dyes having a 1-benzyl-5-amino-pyrazole or a 1-substitued-benzyl-5-aminopyrazole as coupling component. They are useful for dyeing polyamide material and particularly polyester material.

---

The invention relates to dyes having the general formula:

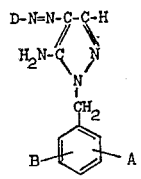

where D denotes the radical of a diazo component of the benzene, thiazole, thiadiazole, benzothiazole, benzothiazole or aminoindazole series, A denotes a hydrogen atom, chlorine atom or a cyano, methyl or methoxy group and B denotes a hydrogen atom, a chlorine atom or a methoxy group.

The radical D may be derived for example from the following amines used as diazo components:

4-nitroaniline,
4-nitro-2-chloroaniline,
4-nitro-2-bromoaniline,
4-nitro-2-methylaniline,
4-nitro-2-cyanoaniline,
4-nitro-2-cyano-6-chloroaniline,
4-nitro-2-methoxyaniline,
2,4-dinitroaniline,
2,4-dintro-6-chloroaniline,
2,4-dinitro-6-bromoaniline,
2,6-dichloro-4-nitroaniline,
2,6-dibromo-4-nitroaniline,
2-chloro-6-bromo-4-nitroaniline,
4-nitro-2-cyano-6-bromoaniline,
2-methylsulfonyl-4-nitroaniline,
2,4-dibromo-6-cyanoaniline,
2-cyano-5-methoxy-4-nitroaniline,
methyl 2-amino-5-nitrobenzoate,
methyl 2-amino-3-bromo-5-nitrobenzoate,
p-aminobenzoanilide,
2-aminothiazole,
2-amino-5-nitrothiazole,
2-aminobenzothiazole,
2-amino-6-methoxybenzothiazole,
2-amino-6-ethoxybenzothiazole,
2-amino-5-phenylthiadiazole-(3,4),
2-amino-4-methylmercaptothiadiazole-(2,4),
3-amino-(2,1)-benzoisothiazole,
3-amino-5-nitro-(2,1)benzoisothiazole,
3-amino-5-nitro-7-bromo-(2,1)-benzoisothiazole,
3-amino-5,7-dibromo-(2,1)-benzoisothiazole, Aminoazobenzene and substitution products derived therefrom such as 4-amino-2-methyl-2',4'-dinitroazobenzene,
4-amino-2',3'-dichloro-4'-nitroazobenzene or
4-amino-3-chloro-2'-cyano-4'-nitroazobenzene are also suitable.

Examples of coupling components are:

1-benzyl-5-aminopyrazole,
1-(2'-methoxybenzyl)-5-aminopyrazole,
1-(2',3'-dimethoxybenzyl)-5-aminopyrazole,
1-(2'-chlorobenzyl-5-aminopyrazole,
1-(2',4'-dichlorobenzyl)-5-aminopyrazole,
1-(2',6'-dichlorobenzyl)-5-aminopyrazole,
1-(4'-methylbenzyl)-5-aminopyrazole,
1-(4'-cyanobenzyl)-5-aminopyrazole.

The new dyes are yellow to violet substances which are suitable for dyeing natural and synthetic fibers, particularly polyamides, such as nylon 6 or nylon 6,6, and polyesters such as polyethylene glycol terephthalate or compounds having an analogous chemical constitution. Yellow to violet dyeings which are distinguished by excellent fastness properties and high tinctorial strength are obtained with the new dyes.

A group of industrially preferred dyes has the general formula:

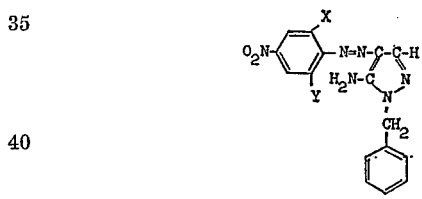

where

X denotes a chlorine atom, bromine atom or carbomethoxy, carboethoxy, cyano, methylsulfonyl, nitro or methoxy group and
Y denotes a hydrogen, chlorine or bromine atom.

The new dyes may be prepared by reacting a diazo compound of an amine having the general formula

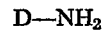
D—NH$_2$ with a compound having the general formula:

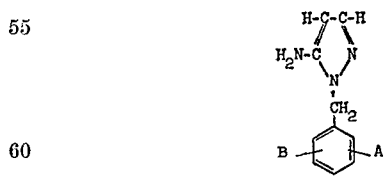

in which A, B and D have the above meanings.

The invention is illustrated by the following examples, in which the parts and percentages are by weight unless stated otherwise.

EXAMPLE 1

9.2 parts of 2,4-dinitro-6-bromoaniline is introduced at 10° to 15° C. into 48 parts of concentrated sulfuric acid. As soon as the amine has dissolved, the whole is cooled to 5° C. and 35 parts of a mixture (17:3) of glacial acetic acid and propionic acid is added gradually. Then 10.5 parts of nitrosylsulfuric acid is introduced slowly at from 0° to 5° C. and the whole is stirred for three hours at this temperature. The diazonium salt solution is then added to a cooled solution of 6.1 parts of 1-benzyl-5-aminopyrazole in 150 parts of methanol and 50 parts of water. When all has been added, the temperature is kept for one hour at 0° to 5° C. The deposited dye is suction filtered, washed with water until it is neutral and dried. 13.9 parts of a compound having the formula:

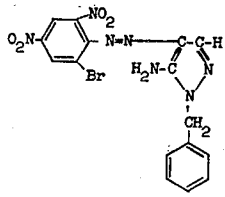

is obtained. It has a melting point of 164° to 167° C. Reddish orange dyeings are obtained therewith on polyester fibers or cloth.

EXAMPLE 2

8.46 parts of 2-amino-3-bromo-5-nitrobenzonitrile is added in portions at 0° to 5° C. to a mixture of 40 parts of 85% sulfuric acid and 11 parts of a nitrosylsulfuric acid which contains 2.52 parts of sodium nitrite and the whole is stirred for three hours at 0° to 5° C. 40 parts of a mixture (17:3) of glacial acetic acid and propionic acid is gradually added and the diazonium salt solution thus obtained is allowed to flow into a cooled solution of 6.1 parts of 1-benzyl-5-aminopyrazole in 150 parts of methanol and 50 parts of water. When all has been added, the whole is stirred for another half an hour at 0° to 5° C. and then the dye formed is suction filtered and washed with water until it is neutral. 15 parts of a compound having the formula:

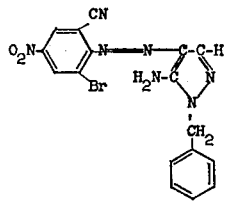

is obtained. It has a melting point of 208° to 210° C., and it dyes polyesters reddish orange shades.

EXAMPLE 3

6.45 parts of 2,4-dinitroaniline is dissolved in 48 parts of concentrated sulfuric acid. The solution is cooled to 0° to 5° C. and 35 parts of a mixture (17:3) of glacial acetic acid and propionic acid is gradually added. 10.5 parts of nitrosylsulfuric acid is slowly added at 0° to 5° C. and then the mixture is stirred for three hours at this temperature. The diazonium salt solution is added to a cooled solution of 6.1 parts of 1-benzyl-5-aminopyrazole in 150 parts of methanol and 50 parts of water. When coupling is over, the deposited dye is suction filtered, washed with water until it is neutral and dried. 11.2 parts of a dye having the formula:

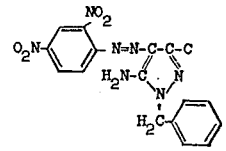

is obtained. It has a melting point of 209° to 212° C. and gives reddish orange dyeings on polyesters.

EXAMPLE 4

8.46 parts of 2-chloro-4-nitro-6-bromoaniline is diazotized as in Example 1. The diazonium salt solution obtained is added at 0° to 5° C. to a solution of 6.1 parts of 1-benzyl-5-aminopyrazole in 150 parts of methanol and 50 parts of water. When coupling is over the mixture is kept at 0° to 5° C. for another half an hour; the dye is then suction filtered, washed with water and dried. 13.4 parts of a compound having the formula:

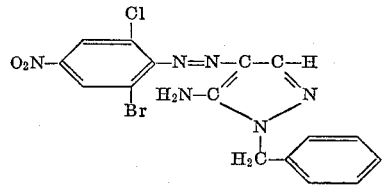

is obtained having a melting point of 134° to 140° C.

EXAMPLE 5

10.35 parts of 2,6-dibromo-4-nitroaniline is diazotized as in Example 1. The diazonium salt solution obtained is added at 0° to 5° C. to a solution of 6.1 parts of 1-benzyl-5-aminopyrazole in 150 parts of methanol and 50 parts of water. When coupling is over, the whole is stirred for another half an hour at this temperature. The dye is then suction filtered, washed with water until it is neutral and dried. 14.2 parts of a compound having the formula:

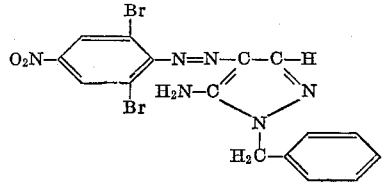

is obtained. It has a melting point of 107° to 112° C. Yellowish brown dyeings are obtained with it on polyesters.

When amines D—NH$_2$ characterized by the radicals D given in the following table are used for the production of the dyes, the dyes obtained dye polyester fibers and polyamide fibers the shades indicated.

| Example | D | Shade of dye on polyester | Polyamide |
|---|---|---|---|
| 6 | $O_2N-\langle\bigcirc\rangle-$ with Cl | Reddish orange | Reddish orange. |
| 7 | $O_2N-\langle\bigcirc\rangle-$ with CN | ____do____ | Do. |
| 8 | $O_2N-\langle\bigcirc\rangle-SO_2CH_3$ | Yellow | Yellow. |

| Example | D | Shade of dye on polyester | Polyamide |
|---|---|---|---|
| 9 | (CH₃)₂N—SO₂—C₆H₄— | Yellow | Yellow. |
| 10 | C₆H₅—NH—C(O)—C₆H₄— | do | Do. |
| 11 | benzothiazol-2-yl | Red | Red. |
| 12 | benzothiazol-2-yl (isomer) | Yellowish orange | Yellowish orange. |
| 13 | 5-phenyl-1,3,4-thiadiazol-2-yl | Yellowish red | Yellowish red. |
| 14 | 5-nitrobenzisothiazol-3-yl | Reddish violet | Reddish violet. |
| 15 | C₆H₅—N=N—C₆H₄— | Yellowish red | Yellowish orange. |
| 16 | H₂N—SO₂—C₆H₄— | Yellow | Yellow. |
| 17 | 6-methoxybenzothiazol-2-yl | Yellowish red | Yellowish red. |
| 18 | 4-bromo-6-nitrobenzothiadiazol-2-yl | Reddish violet | Reddish violet. |
| 19 | 5-nitrothiazol-2-yl | Brownish yellow | Brownish yellow. |
| 20 | thiazol-2-yl | Yellow | Yellow. |
| 21 | benzotriazol-5-yl | do | Do. |
| 22 | O₂N—C₆H₄— | Yellowish orange | Yellowish orange. |
| 23 | O₂N—C₆H₃(COOCH₃)— | Reddish orange | Reddish orange. |
| 24 | 2,4-dibromo-6-cyanophenyl | Yellowish orange | Yellow. |
| 25 | O₂N—C₆H₃(OCH₃)— | do | Yellowish orange. |

| Example | D | Shade of dye on polyester | Polyamide |
|---|---|---|---|
| 26 | 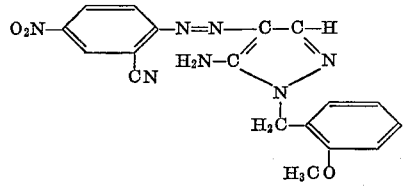 | Yellowish orange | Yellowish orange. |
| 27 | 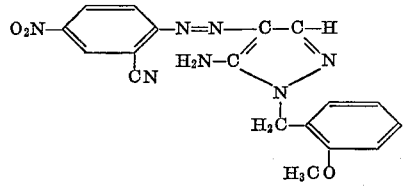 | do | Do. |

EXAMPLE 28

5.33 parts of 2-cyano-4-nitroaniline is dissolved in 38 parts of concentrated sulfuric acid at 10° to 12° C. Then at 0° to 5° C., 30 parts of a mixture (17:3) of glacial acetic acid and propionic acid is dripped in, 8.2 parts of nitrosylsulfuric acid is added and the whole is stirred for three hours at 0° to 5° C. The diazo solution is then added gradually to a solution of 6.1 parts of 1-(2'-methoxybenzyl)-5-aminopyrazole (0.03 mole) in 100 parts of methanol and 100 parts of water. The dye is suction filtered, washed with water until it is neutral and dried at 60° C. at subatmospheric pressure. 9.6 parts of a dye having the formula:

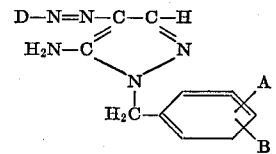

is obtained which dyes polyesters orange shades with very good fastness properties.

EXAMPLE 29

7.28 parts of 2-amino-3-bromo-5-nitrobenzonitrile is added in portions at 0° to 5° C. to a mixture of 34 parts of 85% sulfuric acid and 9.5 parts of nitrosylsulfuric acid. After the whole has been stirred for three hours at 0° to 5° C., 34 parts of a mixture (17:3) of glacial acetic acid and propionic acid is slowly added and the diazo solution is dripped into a solution of 6.1 parts of 1-(2'-methoxybenzyl)-5-aminopyrazole in 100 parts of methanol and 100 parts of water. After the usual isolation procedure, 11.0 parts of a dye having the formula:

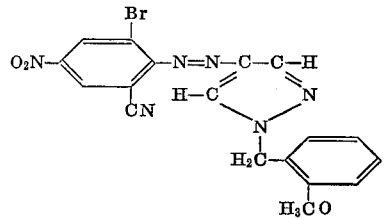

is obtained. It dyes polyesters orangey red shades having very good fastness properties. The dyes characterized in the following table by the substituents A, B and D and having the general formula:

$$D-N=N-C-C-H$$
$$H_2N-C\quad N$$
$$N$$
$$H_2C-\bigcirc_B^A$$

are obtained by analogous methods:

| Example | D | A | B | Shade on polyesters |
|---|---|---|---|---|
| 30 | O₂N—⟨⟩—, Cl | 2'-OCH₃ | H | Orange. |
| 31 | O₂N—⟨⟩—, Br | 2'-OCH₃ | H | Do. |
| 32 | O₂N—⟨⟩—, NO | 2'-OCH₃ | H | Orangey red. |
| 33 | O₂N—⟨⟩—, Br, NO₂ | 2'-OCH₃ | H | Do. |
| 34 | O₂N—⟨⟩—, Br, NO₂ | 2'-OCH₃ | H | Orange. |
| 35 | O₂N—⟨⟩—, Br, Br | 2'-OCH₃ | H | Do. |

| Example | D | A | B | Shade on polyesters |
|---|---|---|---|---|
| 36 | O₂N—⟨⟩—, SO₂CH₃ | 2'-OCH₃ | H | Orange. |
| 37 | O₂N—⟨⟩—, Cl, Cl | 2'-OCH₃ | H | Do. |
| 38 | O₂N—⟨⟩—, COOC₂H₅ | 2'-OCH₃ | H | Do. |
| 39 | O₂N—⟨⟩—, Br, COOCH₃ | 2'-OCH₃ | H | Do. |

EXAMPLE 40

4.9 parts of 2-cyano-4-nitroaniline is diazotized as in Example 28 and coupled with a solution of 5.8 parts of 1-(2',3'-dimethoxybenzyl)-5-aminopyrazole in 100 parts of methanol and 100 parts of water. 6.6 parts of the dye having the formula:

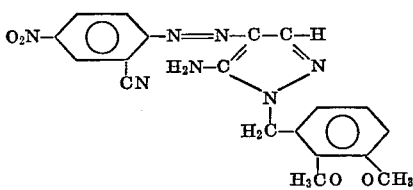

is obtained which dyes polyesters orange.

EXAMPLE 41

4.6 parts of 2,4-dinitroaniline is diazotized as described in Example 28. The diazo solution is coupled with a solution of 5.8 parts of 1-(2',3'-dimethoxybenzyl)-5-aminopyrazole in 100 parts of methanol and 100 parts of water. 3.2 parts of the dye having the formula:

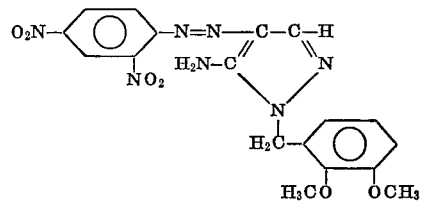

is obtained which dyes polyesters orangey red shades.

The dyes characterized by D, A and B in the following table are obtained analogously.

| Example | D | A | B | Shade on polyesters |
|---|---|---|---|---|
| 42 | O₂N—⟨⟩—, Cl | 2'-OCH₃ | 3'-OCH₃ | Orange. |
| 43 | O₂N—⟨⟩—, Br | 2'-OCH₃ | 3'-OCH₃ | Do. |
| 44 | O₂N—⟨⟩—, Br, CN | 2'-OCH₃ | 3'-OCH₃ | Orangey red. |
| 45 | O₂N—⟨⟩—, Br, NO₂ | 2'-OCH₃ | 3'-OCH₃ | Do. |
| 46 | O₂N—⟨⟩—, Br, Cl | 2'-OCH₃ | 3'-OCH₃ | Orange. |
| 47 | O₂N—⟨⟩—, Br, Br | 2'-OCH₃ | 3'-OCH₃ | Do. |

| Example | D | A | B | Shade on polyesters |
|---|---|---|---|---|
| 48 | O₂N—⌬—SO₂CH₃ | 2'-OCH₃ | 3'-OCH₃ | Orange. |
| 49 | O₂N—⌬(Cl)(Cl) | 2'-OCH₃ | 3'-OCH₃ | Do. |
| 50 | O₂N—⌬(I)(COOC₂H₅) | 2'-OCH₃ | 3'-OCH₃ | Do. |
| 51 | O₂N—⌬(Br)(COOCH₃) | 2'-OCH₃ | 3'-OCH₃ | Do. |
| 52 | O₂N—⌬—Cl | 2'-Cl | H | Do. |
| 53 | O₂N—⌬—Br | 2'-Cl | H | Do. |
| 54 | O₂N—⌬(Br)(CN) | 2'-Cl | H | Orangey red. |
| 55 | O₂N—⌬—NO₂ | 2'-Cl | H | Do. |
| 56 | O₂N—⌬(Br)(NO₂) | 2'-Cl | H | Do. |
| 57 | O₂N—⌬(Br)(Cl) | 2'-Cl | H | Do. |
| 58 | O₂N—⌬(Br)(Br) | 2'-Cl | H | Do. |
| 59 | O₂N—⌬(I)(SO₂CH₃) | 2'-Cl | H | Do. |
| 60 | O₂N—⌬—COOCH₃ | 2'-Cl | H | Do. |
| 61 | O₂N—⌬(Br)(COOC₂H₅) | 2'-Cl | H | Do. |
| 62 | O₂N—⌬—CN | 2'-Cl | H | Orange. |

| Example | D | A | B | Shade on polyesters |
|---|---|---|---|---|
| 63 | O₂N–⟨C₆H₃(Cl)(Cl)⟩– (2,4-Cl,Cl; NO₂) | 2'-Cl | H | Orange. |
| 64 | O₂N–⟨C₆H₃(Cl)⟩– | 2'-Cl | 4'-Cl | Do. |
| 65 | O₂N–⟨C₆H₃(Cl)⟩– | 2'-Cl | 6'-Cl | Do. |
| 66 | O₂N–⟨C₆H₃(Br)⟩– | 2'-Cl | 4'-Cl | Do. |
| 67 | O₂N–⟨C₆H₃(Br)⟩– | 2'-Cl | 6'-Cl | Do. |
| 68 | O₂N–⟨C₆H₃(CN)⟩– | 2'-Cl | 4'-Cl | Do. |
| 69 | O₂N–⟨C₆H₃(CN)⟩– | 2'-Cl | 6'-Cl | Do. |
| 70 | O₂N–⟨C₆H₃(NO₂)⟩– | 2'-Cl | 4'-Cl | Orangey red. |
| 71 | O₂N–⟨C₆H₃(NO₂)⟩– | 2'-Cl | 6'-Cl | Do. |
| 72 | O₂N–⟨C₆H₃(Br)(NO₂)⟩– | 2'-Cl | 4'-Cl | Do. |
| 73 | O₂N–⟨C₆H₃(Br)(NO₂)⟩– | 2'-Cl | 6'-Cl | Do. |
| 74 | O₂N–⟨C₆H₃(Br)(Br)⟩– | 2'-Cl | 4'-Cl | Orange. |
| 75 | O₂N–⟨C₆H₃(Br)(Br)⟩– | 2'-Cl | 6'-Cl | Do. |
| 76 | O₂N–⟨C₆H₃(SO₂CH₃)⟩– | 2'-Cl | 4'-Cl | Do. |
| 77 | O₂N–⟨C₆H₃(SO₂CH₃)⟩– | 2'-Cl | 6'-Cl | Do. |
| 78 | O₂N–⟨C₆H₃(COOCH₃)⟩– | 2'-Cl | 4'-Cl | Do. |

| Example | D | A | B | Shade on polyesters |
|---|---|---|---|---|
| 79 | $O_2N$-C6H3(COOCH3)- | 2'-Cl | 6'-Cl | Orange |
| 80 | $O_2N$-C6H2(Br)(COOC2H5)- | 2'-Cl | 4'-Cl | Do. |
| 81 | $O_2N$-C6H2(Br)(COOC2H5)- | 2'-Cl | 6'-Cl | Do. |
| 82 | $O_2N$-C6H2(Cl)(Cl)- | 2'-Cl | 4'-Cl | Do. |
| 83 | $O_2N$-C6H2(Cl)(Cl)- | 2'-Cl | 6'-Cl | Do. |
| 84 | $O_2N$-C6H2(Br)(Cl)- | 2'-Cl | 4'-Cl | Do. |
| 85 | $O_2N$-C6H2(Br)(CN)- | 2'-Cl | 4'-Cl | Do. |
| 86 | $O_2N$-C6H3(NO2)- | 4'-CH3 | H | Orangey red |
| 87 | $O_2N$-C6H3(CN)- | 4'-CH3 | H | Orange. |
| 88 | $O_2N$-C6H3(Cl)- | 4'-CH3 | H | Do. |
| 89 | $O_2N$-C6H3(Br)- | 4'-CH3 | H | Do. |
| 90 | $O_2N$-C6H2(Br)(CN)- | 4'-CH3 | H | Orangey red. |
| 91 | $O_2N$-C6H2(Br)(NO2)- | 4'-CH3 | H | Do. |
| 92 | $O_2N$-C6H2(Br)(Br)- | 4'-CH3 | H | Orange |
| 93 | $O_2N$-C6H2(Cl)(Cl)- | 4'-CH3 | H | Do. |

| Example | D | A | B | Shade on polyesters |
|---|---|---|---|---|
| 94 | $O_2N-$⟨ring: Cl top, Br bottom⟩$-$ | 4'-Cl | H | Orange. |
| 95 | $O_2N-$⟨ring: $SO_2CH_3$ bottom⟩$-$ | 4'-Cl | H | Do. |
| 96 | $O_2N-$⟨ring: $COOC_2H_5$ bottom⟩$-$ | 4'-Cl | H | Do. |
| 97 | $O_2N-$⟨ring: Br top, $COOCH_3$ bottom⟩$-$ | 4'-Cl | H | Do. |
| 98 | $O_2N-$⟨ring: Cl bottom⟩$-$ | 4'-CN | H | Do. |
| 99 | $O_2N-$⟨ring: Br bottom⟩$-$ | 4'-CN | H | Do. |
| 100 | $O_2N-$⟨ring: $NO_2$ bottom⟩$-$ | 4'-CN | H | Reddish orange. |
| 101 | $O_2N-$⟨ring: Br top, $NO_2$ bottom⟩$-$ | 4'-CN | H | Do. |
| 102 | $O_2N-$⟨ring: Cl top, Cl bottom⟩$-$ | 4'-CN | H | Do. |
| 103 | $O_2N-$⟨ring: Br top, Cl bottom⟩$-$ | 4'-CN | H | Do. |
| 104 | $O_2N-$⟨ring: Br top, Br bottom⟩$-$ | 4'-CN | H | Do. |
| 105 | $O_2N-$⟨ring: $SO_2CH_3$ bottom⟩$-$ | 4'-CN | H | Do. |
| 106 | $O_2N-$⟨ring: $COOC_2H_5$ bottom⟩$-$ | 4'-CN | H | Do. |
| 107 | $O_2N-$⟨ring: $COOCH_3$ bottom⟩$-$ | 4'-CN | H | Do. |
| 108 | $O_2N-$⟨ring: CN top⟩$-$ | 4'-CN | H | Do. |
| 109 | $O_2N-$⟨ring: Br top, CN bottom⟩$-$ | 4'-CN | H | Reddish orange. |

We claim:
1. A disperse dye of the 5-aminopyrazole series having the formula

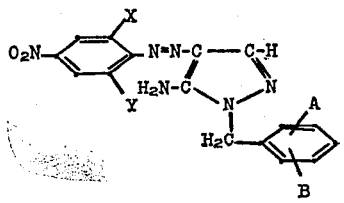

wherein:
X denotes chlorine, bromine, carbomethoxy, carboethoxy, cyano, methylsulfonyl, nitro or methoxy;
Y denotes hydrogen, chlorine or bromine;
A denotes hydrogen, chlorine, cyano, methyl or methoxy; and
B denotes hydrogen, chlorine or methoxy.

2. A dye as claimed in claim 1 having the formula

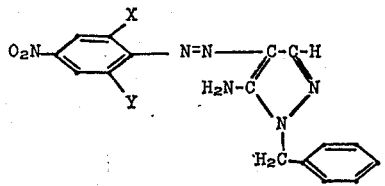

wherein:
X denotes chlorine, bromine, carbomethoxy, carboethoxy, cyano, methylsulfonyl, nitro or methoxy, and
Y denotes hydrogen, chlorine or bromine.

3. The dye of the formula

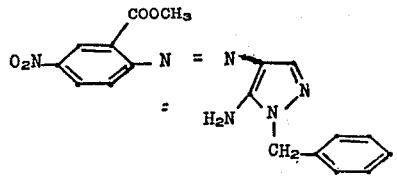

References Cited
FOREIGN PATENTS
1,425,218   12/1965   France _____ 260—163

CHARLES B. PARKER, Primary Examiner
D. M. PAPUGA, Assistant Examiner

U.S. Cl. X.R.
260—155, 162, 310 R; 8— 178, 179

UNITED STATES PATENT OFFICE
CERTIFICATE OF CORRECTION

Patent No. 3,639,387                    Dated February 1, 1972

Inventor(s) Hans Juergen Sturm et al

It is certified that error appears in the above-identified patent and that said Letters Patent are hereby corrected as shown below:

Column 1, line 18, "1-substitued" should read -- 1-substituted --; line 34, "benzothiaz-" should read -- benzoisothiaz- --; line 50, "2,4-dintro-6-chloroaniline" should read -- 2,4-dinitro-6-chloroaniline --.

Column 2, line 6, "3-amino-5,7-dibromo-(2,1)-benzoisothiazole," should read -- 3-amino-5,7-dibromo-(2,1)-benzoisothiazole. --.

Column 4, in the table, Example 8, that portion of the formula reading "Cn" should read -- CN --.

Column 5, in the table, Example 14, " 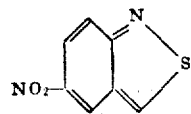 " should read --  --.

Column 8, lines 41-44, that portion of the formula reading " 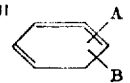 " should read -- $\underset{B}{\underset{|}{\bigotimes}}{}^A$ --.

Column 8, in the table, Example 32, that portion of the formula reading "NO" should read -- NO₂ --.

Column 15, in the table, Example 93, that portion of the formula reading "C" should read -- Cl --.

Column 17, in the table, Example 102, "Do." should read -- Orange. --.

Signed and sealed this 27th day of June 1972.

(SEAL)
Attest:

EDWARD M. FLETCHER, JR.
Attesting Officer

ROBERT GOTTSCHALK
Commissioner of Patents